UNITED STATES PATENT OFFICE.

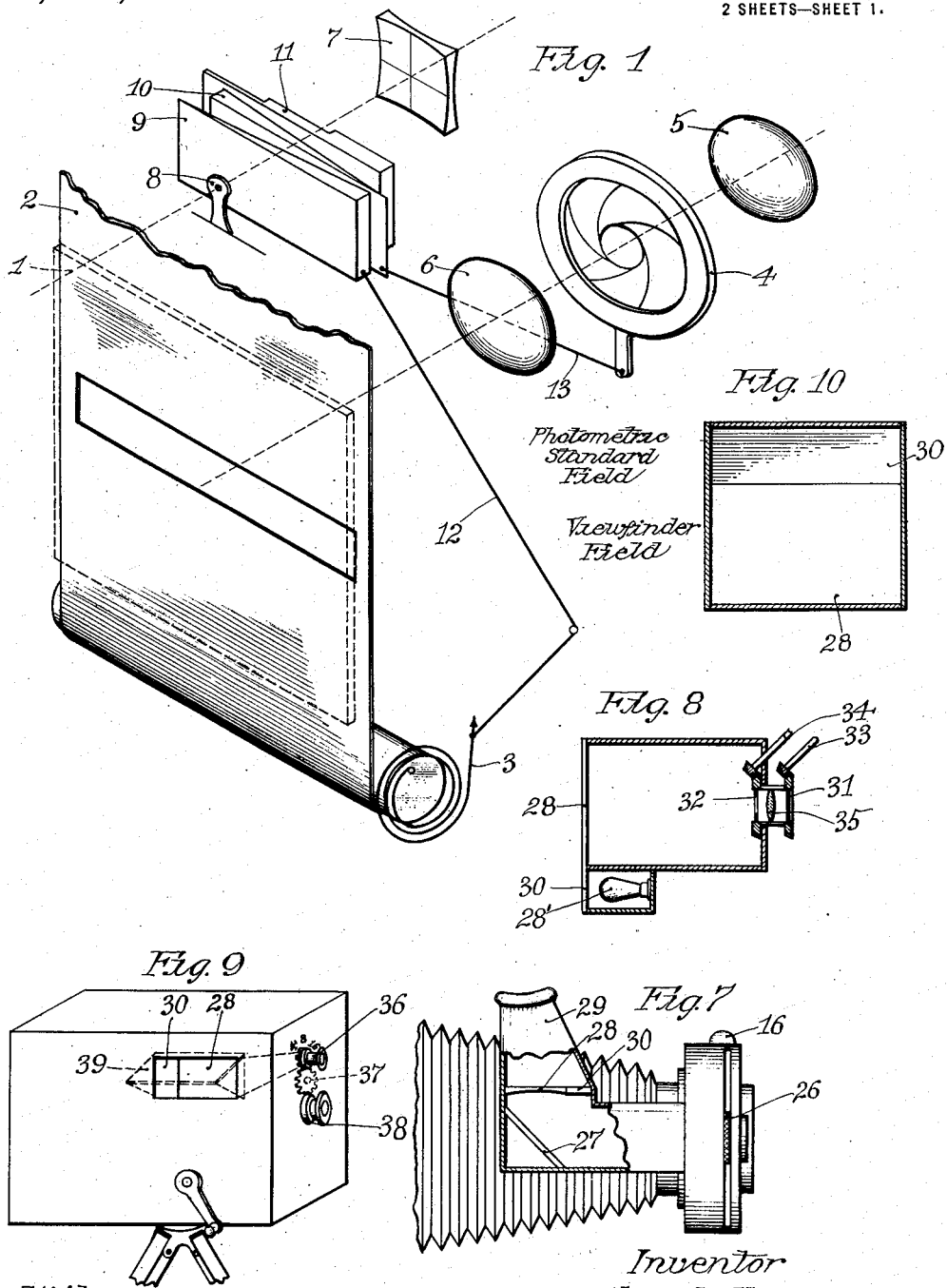

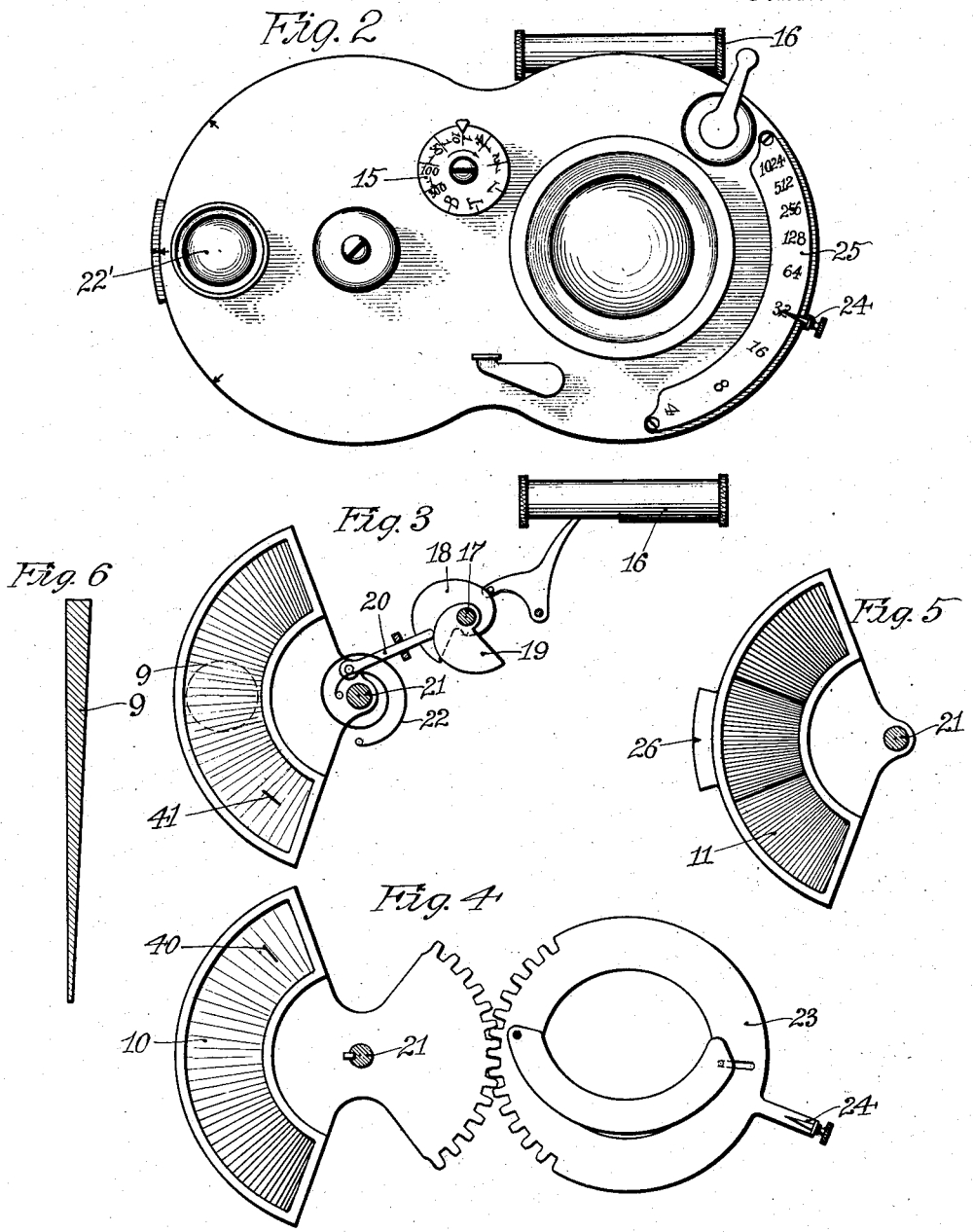

ALFRED HERZ, OF CHICAGO, ILLINOIS.

PHOTOGRAPHY.

1,213,485.  Specification of Letters Patent.  Patented Jan. 23, 1917.

Application filed August 27, 1915. Serial No. 47,612.

*To all whom it may concern:*

Be it known that I, ALFRED HERZ, a citizen of the United States, residing at Chicago, in the county of Cook and State of Illinois, have invented a certain new and useful Improvement in Photography, of which the following is a full, clear, concise, and exact description, reference being had to the accompanying drawings, forming a part of this specification.

My invention relates to photography, and, more particularly, to a method of and means for determining proper exposure of the sensitized plates to light from a subject.

While great effort has been expended and extensive research and experimentation have been carried on to perfect the lens, shutter and other mechanical apparatus employed in securing proper image formation, and although the manufacturers have produced sensitized plates of great speed and accuracy, the photographer is still working at a great disadvantage through inability to determine the light value of a given subject to secure the proper exposure. No matter how nearly perfect the optical apparatus may be, it is impossible to secure uniformly good results so long as no means for determining the proper degree of exposure is at hand. The sensitized plate should receive and form the image in proper light value. What is dark in the image should be dark in the print, and what is white in the image should be white in the print, and intermediate values should be in their proper relation. If the plate is over-exposed the balance is destroyed, the picture is flat; and if the plate is under-exposed the picture is too full of contrast. For proper exposure of a given type of plate during the working range of that plate, the following equation must be satisfied:

$$L \times T = K$$

In this equation L represents the quantity of light which is acting. This may be represented by degree of illumination or strength of light from a given subject. T represents the effective time of shutter-opening—that is the length of time that the light acts upon the plate. K is a constant. This equation is true, or approximately true, only through the usual working range of the sensitized plate. If the light is dim, a greater time of exposure is required to give the proper action of the light upon the silver salt or other light sensitive coating of the plate; and, conversely, if the time of exposure is limited, as by the movement of the subject, that factor is practically fixed and a greater quantity of light or a greater degree of illumination is demanded. The factor L may be controlled in the camera by opening up the lens aperture, familiarly known as the stop or iris diaphragm; or it can be controlled exteriorly, as where artificial illumination is employed, by increasing the degree of illumination upon the subject. The factor T may be controlled by control of the shutter-speed, uncapping, etc. It can now be seen that a proper exposure cannot be made unless the two quantities L and T, which are, in a degree inter-related, are properly fixed.

My invention aims to provide a method of operation and means for determining and controlling the values of L and T to secure proper exposure of the plate to the light from the subject.

According to my invention, I employ means for evaluating the degree of illumination and mechanically connect that means with either the shutter-speed-adjusting means or with the iris diaphragm mechanism, or both.

Since it may be desirable to employ a variety of plates having different speeds, I provide means for compensating for this difference which, in the equation, amounts to changing the value of the constant K; that is to say, I introduce means for distributing the effect of a change of plate-speed between the factors L and T. In its broadest aspect, my invention consists of a photometric scheme for evaluating the degree of illumination of a subject, as by comparing the illumination of the subject with that of a given standard of illumination, and simultaneously adjusting the stop and shutter mechanism, either jointly or singly, to give the proper exposure of the plate for that value of illumination. Such other factors as affect the degree of exposure may be taken into account by suitable adjustment of the photometer, and in this way made to appear in stop or shutter adjustment, or in adjustment of both.

One important feature of my invention relates to simultaneously "finding" the subject and making adjustment for stop and shutter mechanism. That is to say, my mechanism serves both as a view-finder and as an exposure-meter for the camera.

I shall now explain, with the aid of the accompanying drawings, which form a part of the present specification, the manner in which my invention may be practised so as to enable those skilled in the art to construct and operate mechanism embodying my invention.

Figure 1 is a schematic diagram illustrating the operation and apparatus for carrying out the same; Fig. 2 is a front elevation of one form of shutter-mechanism embodying my invention; Fig. 3 is a detail view illustrating the shutter speed-adjusting mechanism connected to the timing modifier. Fig. 4 is a view of a light-dimming or modifying mechanism connected to the stop or iris-diaphragm mechanism; Fig. 5 is a view of the dimming or light-modifying mechanism corresponding to the different speeds of plates employed; Fig. 6 is a cross-sectional development of one of the cobalt wedges employed in the mechanism of Figs. 3 and 4; Fig. 7 is a side elevation, partly in section, of a combined view-finder and photometer employing the mechanism shown in Figs. 2 to 6, inclusive; Fig. 8 is a modified form of the apparatus; Fig. 9 shows one manner of applying the invention to a cinematographic camera; and Fig. 10 illustrates the arrangement of photometric standard field and the view-finding field.

In Fig. 1 I have illustrated in a diagrammatic manner the general combination of elements which I may employ in carrying out my invention. The sensitized plate 1 is shown in dotted line back of the focal-plane shutter 2, which is provided with spring means 3 for controlling the speed thereof. A stop or iris-diaphragm mechanism 4 is arranged between the two parts 5 and 6 of the lens, which are arranged to form an image upon the plate 1. In order to determine whether the image is properly placed with respect to the field of the plate 1, it is customary to employ what is known as a view-finder. The view-finder is, in general, a separate image-defining mechanism arranged in substantially parallel arrangement with the main image-forming mechanism, the image of the view-finder being adapted to be viewed by the eye to determine the proper pointing of the camera. The particular form of view-finder is immaterial, as this forms no part of the invention.

I have illustrated one form of view-finder comprising the negative lens 7 and a peep-hole 8 for viewing the image on the lens 7. Between the peep-hole 8 and the lens 7, in which the image of the subject appears, I have placed a number of light-modifying devices, in this case consisting of the wedges 9 and 10 and the stepped plate 11, for modifying the illuminating power of the image formed on the lens 7 upon the eye of the observer. The wedge 9, which may be constructed of cobalt glass, is connected by means of suitable mechanism 12 to the shutter-speed-modifying mechanism, and the wedge 10, which may also be constructed of cobalt glass, is connected by suitable mechanism 13 to the stop or iris diaphragm 4. The stepped plate 11, which is also constructed of cobalt glass, is independently adjustable in accordance with the quality or speed of the plate 1, which is employed in the main camera.

In view of the fact that the wedge 9 controls the speed of the shutter, I designate it as the timing modifier. I designate the wedge 10 as the light modifier, and the stepped plate 11 as the plate modifier. The action of these modifiers is to show the image in monochromatic light. Since the modifiers are formed of cobalt glass, they will transmit only the blue rays. In this connection, it is to be noted that the reason for employing the cobalt wedges is that the blue rays are the actinic rays and are the ones which have the greatest effect upon the sensitized plate. Hence, it is advisable to compare the light given off by the various subjects in terms of the light which will affect the plate. These light-modifiers 9, 10 and 11 tend to dim the image upon the negative lens 7, either in whole or in part, as desired, and the operator of the camera adjusts the modifiers 9 and 10 to bring the image to the desired intensity. When this intensity has been attained the shutter-speed and the iris opening will have been so adjusted and interrelated that the proper light exposure will be secured for the plate then used.

The connection between the wedges 9 and 10 and the shutter and iris, respectively, may be of such a character that proper setting of the shutter-speed and iris opening will be secured when the image disappears on the finder, or when a proper degree of illumination as compared with a photometric standard of illumination has been reached. It is immaterial whether the comparison be made between a standard quantity of illumination or an absence of illumination. The principle of the apparatus is precisely the same.

The plate modifier 11 is set to modify the light from the image on the lens 7 in accordance with the sensitiveness of the plate 1, and, although this modifier is not directly connected to the shutter or stop mechanism, it is obvious that its effect is distributed between these two devices, inasmuch as the light from the lens 7 in the finder is suitably modified by the modifier 11, and the adjustable modifiers 9 and 10 are then set to secure the proper degree of illumination of the image from the lens 7, and therefore the influence of the adjustment for the sensitiveness of the plate will be expressed in terms of shutter and stop adjustment.

The plate modifier may be constructed to compensate for the general sensitiveness of the plate to light or the sensitiveness to special colors or to special subjects.

In Fig. 2 I have illustrated my invention as applied to a well-known shutter and lens arrangement, which employs an adjusting wheel 15 for adjusting the speed of shutter mechanism. This wheel 15 is provided with suitable indications for indicating the speed of setting of the shutter. The shutter, which is of the segmental type, is governed by the dash-pot 16. The shaft 17, which is secured to the setting-wheel 15, bears a cam 18 for adjusting the speed of the shutter and bears, also, a cam 19, which controls the setting of the modifier 9. As the cam 19 is rotated the arm 20 is pushed forward to swing the modifier 9 about the shaft 21 as a pivot, against the tension of the spring 22. It will be noted that in this case the modifier 9 is arranged in the arc of a circle. This is merely for convenience in manufacture and saving space in the assembled apparatus. Fig. 6 shows, in cross-section, the development of the modifier 9. The modifier 10, which in the assembled mechanism as shown in Fig. 2 is superposed on the modifier 9 and mounted on the same shaft 21, lies back of the lens 22', forming part of the view-finder. The modifier 10 is geared to the iris-diaphragm operating mechanism 23, so that as the indicator 24 is moved around on the scale 25 the modifier 10 will be set accordingly. The plate-modifier 11 is also superposed on the modifiers 9 and 10, so that the light passing through the lens 22' will pass through the modifiers in turn. The modifier 11 is built up of a series of steps arranged in circular fashion about the shaft 21 and provided with an exterior thumb-piece 26 for convenient setting to compensate for the different qualities of sensitized plates which are employed.

It is to be noted that in the diagram of Fig. 1 I have illustrated the shutter as a focal-plane shutter, or curtain shutter, while in the mechanism of Figs. 2 to 6 I have illustrated mechanism employing a segmental shutter. It is obvious that any type of shutter may be employed, as any mechanic skilled in the art will understand that the adjustment of the modifier 9 is to be connected with the adjustment of the speed of the shutter. Inasmuch as the scale of shutter-speed is not uniform, it may be advisable to form the cam 19 in such manner that the adjustment of thickness of the wedge 9 will be comparable with the adjustment of shutter-speed.

I have shown the modifiers 9 and 10 as comprising wedges or angles of the same value, so as to secure parallel faces or equal thicknesses at all times. In view of the fact that shutter-speed adjustment and iris-diaphragm adjustment may not follow a straight-line law, the wedges 9 and 10 need not be made straight-sided but may be made of curved cross-section. Although this will destroy the parallel relation which it is preferable to maintain the size of opening for the view-finder lens may be made small enough that this difference in thickness will be unimportant.

In Fig. 7 I have illustrated the lens and shutter mechanism of Figs. 2 to 6 as applied to a well-known type of camera and to the brilliant finder. In this case an inverted image is formed by the lens 22 placed in front of the modifiers 9, 10 and 11, and the inverted image is turned upright by the mirror 27 and cast upon the negative lens 28, which forms the field of the view-finder. A hood 29 may be provided, although the same is unnecessary. I have placed adjacent the view-finder field 28 a small field 30, which comprises the photometric standard field. This photometric standard field is the standard of illumination with which the image on the lens 28 is to be compared in order to obtain the proper setting of the modifiers 9 and 10, and the consequent setting of the shutter and stop mechanism. The luminous field 30 may be a phosphorescent screen, in which case it is made removable so as to be readily exposed to light in order to properly energize the same. A fluorescent screen may be employed, or any other source of light that is found convenient may be employed in this connection. In Fig. 8 I have shown an electric lamp 28' placed back of the photometric standard field 30, which in this case may be of blue cobalt glass, either plain or frosted, to correspond to the view-finder field 28. As above mentioned, this feature of the invention may be varied, as the particular value of the source of illumination is unimportant, it being important only that the same be fairly constant, in order that it may be used as a standard.

In Fig. 8 I have shown a different form of modifier for modifying the light passing from the subject through the view-finder lens to the field of the finder. In this case I employ an iris diaphragm 31, connected by means of the mechanical connection 33 with the shutter-speed-adjusting mechanism, and employ a similar iris diaphragm 32, connected by means of the mechanical connection 34 with the adjustment of the iris or stop mechanism. These modifiers are placed, preferably, at a substantial distance from the lens 35 in order that their effect may be appreciable, and it may be advisable to employ a plurality of lenses 35 in order to give each one of the modifiers a proper influence upon the amount of light passing to the field 28, which, in this case, is shown as a plate of ground glass. It is preferable that the comparison between the view-finder field and the photometric standard field be made in terms of blue light, and hence the fields 28 and 30 may be formed of cobalt glass.

In Fig. 9 I have shown the invention as applied to a cinematographic camera. In cameras of this type the speed of the shutter is practically a constant, so that no adjustment for shutter-speed is to be made, and in this event the entire adjustment is made in stop opening. I have shown, therefore, no timing modifier, although it is possible to employ the same if desired, and have shown merely a light modifier consisting, in this case, of an iris diaphragm 36 similar to the iris diaphragm 32. This iris diaphragm 36 controls the amount of light which passes into the view-finder and appears on the view-finder field 28. The iris diaphragm of the view-finder is connected by means of the mechanical connection 37, shown in this case as a gear, with the iris diaphragm 38 of the main camera lens. I have shown in dotted lines a hood 39 for screening out extraneous light in order that the comparison between the standard field 30 and the view-finder field 28 may more readily be made. It is to be understood that there is no theoretical objection to the fields 28 and 30 being subject to other light than that between which comparison is to be made. The only condition to be observed is that the extraneous light cast upon both will be equal, and hence, for purposes of comparison, will be of no effect.

The entire field of the finder need not be obstructed as it will suffice to modify the light from a part of the image, the aim being to secure a photometric determination of the degree, quality, or intensity of illumination of the subject to permit proper adjustment of the stop and shutter mechanism of the camera.

The operation of the mechanism will be apparent from the above description. The stop mechanism and the shutter mechanism are adjusted until the image formed in the view-finder approaches a given standard of illumination, and at that point the adjustment of stop and shutter mechanism will be proper to form a correct exposure. If the limit of adjustment on one of these mechanisms is reached, the remainder of the adjustment must be made solely with the other. As a case illustrative of this, assume that the subject is a moving automobile and the time of shutter-opening must be limited due to the rapidity of movement of the subject. The shutter will be set at the proper speed value and modification of the image will then be performed solely by the light modifier, which is connected to the iris opening of the main lens. Or, assume that the subject is poorly illuminated and the iris mechanism is open to a maximum: the timing modifier is then adjusted to bring the image in the finder to the proper value, and, as this is connected to the shutter-speed mechanism, the proper shutter-speed will then be obtained for making a proper exposure.

In the type of mechanism shown in Figs. 2 to 6 I have placed upon the timing modifier 9 a mark or indication 41 to indicate that the limit of adjustment in one direction has been attained. I place a similar mark or indication 40 upon the light modifier 10, but at right-angles to the mark 41 so that the two can be distinguished. In this way it will be apparent to the operator that he is reaching the limit of adjustment of one of the modifiers and can operate the mechanism accordingly.

The indicia of the stop-indicating mechanism and of the shutter speed-indicating mechanism are preferably placed upon the light modifier and upon the timing modifier, so that the operator will have before him on the field of the finder the image and the necessary indicia of the controlling mechanism. These indicia have been omitted from the drawings for the sake of clearness. Any other special indicia, as for indicating limits of operation of the device, may be employed.

I have illustrated the light modifying devices as operating upon the light from the subject to modify the light value of the image. However, I contemplate employing the light modifying devices in connection with the standard of illumination. Either scheme of bringing the two fields to a comparable degree of illumination, or of determining the value of one in terms of the other, or any scheme of comparison of the two falls within the spirit and scope of my invention.

The primary function of the image-defining mechanism in this connection is to segregate, separate or define a certain representative part or portion of the light issuing from the object which is to be photographed in such manner as to permit of comparison or estimate of its relative value being made by the eye. The matter of defining an image is concerned with obtaining, in such condition as to be available for comparison by the eye, a certain part or portion of the light issuing from the object to be photographed. It is in this sense that I employ these terms in the appended claims.

It is apparent that my invention may be embodied in a great variety of apparatus. I therefore intend the following claims to be read as broadly as is consistent with the prior art, and to include all such modifications, variations and substitutions as come within the spirit of my invention, which I consider to be broadly new.

What I claim as new and desire to protect by Letters Patent of the United States is the following:

1. In combination, a view-finder comprising image-defining mechanism, and a main camera comprising exposure-timing, illumination-controlling and image-forming mechanism, adjustable means for evaluating the photometric quality of the image of said view-finder, and means automatically operated by adjustment of said photometric means for adjusting the exposure-timing mechanism and the illumination-controlling mechanism.

2. In combination, a view-finder comprising image-forming or defining mechanism, a main camera comprising exposure-timing, illumination-controlling and image-forming mechanism, adjustable means for evaluating the photometric quality of the image of said view-finder, and means automatically operated by adjustment of said photometric means for adjusting the illumination-controlling mechanism.

3. In combination, a view-finder comprising image-forming or defining mechanism, a main camera comprising image-forming, illumination-controlling and exposure-timing mechanism, adjustable means for evaluating the photometric quality of the image of said view-finder, and means automatically operated by adjustment of said photometric means for adjusting the exposure-timing mechanism.

4. In combination, a lens, a stop mechanism therefor, a shutter mechanism therefor, a view-finder, means for modifying the image of said finder in degree to correspond to the stop opening.

5. In combination, a lens, a stop mechanism therefor, a shutter mechanism, a view-finder, a standard of illumination, and means for modifying the image of said finder in degree to correspond to said stop opening.

6. In combination, a lens, a stop mechanism therefor, a shutter mechanism, a view-finder, means for modifying the image of said view-finder in degree to correspond to the speed of said shutter.

7. In combination, a lens, a stop mechanism, shutter mechanism, a view-finder, a standard of illumination, means for modifying the image of said finder in degree to correspond to the stop opening, and other means for modifying said image in degree to correspond to the speed of said shutter, both of said means being jointly adapted to modify the image to correspond to said standard of illumination.

8. In combination, a lens, a stop mechanism, a shutter mechanism, a view-finder, a standard of illumination, means for modifying the image of said finder in degree to correspond to the stop opening, and means for modifying said image of said finder in degree to correspond to the sensitiveness of said sensitized plate.

9. In combination, exposure-timing, illumination-controlling and image-forming mechanism, a view-finder, means for modifying the image of said finder in degree to correspond to the adjustment of the exposure-timing mechanism, and other means for modifying said image in degree to correspond with the sensitiveness of said sensitized plate, both of said last means conjointly operating to modify said image to bring it to a predetermined illuminating value.

10. In combination, exposure-timing, illumination-controlling and image-forming mechanism, a view-finder, means for modifying the image formed by said finder in degree to correspond to the adjustment of said illumination-controlling mechanism, other means for modifying said image in degree to correspond to adjustment of the illumination-controlling mechanism, and further means for modifying said image in degree to correspond to the sensitiveness of said sensitized plate, said modifying means conjointly operating to produce said image at a given illuminating value.

11. The method of predetermining the proper exposure of a sensitized plate to light from a subject, which consists in defining an image of the subject, then modifying the luminosity of the image to correspond to a given standard illumination, and conjointly therewith setting the exposing mechanism to secure a given desired value of light action on said sensitized plate.

12. The method of maintaining substantially constant the product of factor of illumination and time of exposure, which consists in defining an image of the subject, then modifying the image in degree corresponding with the luminosity of the subject, and then modifying the image still further in degree corresponding to the time of exposure desired, to the extent of bringing the degree of illumination to that of a standard of comparison and setting the exposure controlling mechanism for the plate in accordance with the modification required.

13. The method of securing proper light action from a subject upon a sensitized plate, which consists in defining an independent image of the subject, then modifying the image in degree corresponding to the amount of light which shall fall from said subject upon said plate, and further modifying said image in degree corresponding to the length of time that the light shall fall from said subject upon said plate, in carrying said modifying action to the point of equalizing the intensity of illumination of said image with that of a given standard and setting the exposure controlling mechanism for the plate in accordance with the modification required to bring said image to the desired degree of illumination.

14. The method of securing uniform light action from a subject upon a sensitized plate, which consists in defining an independent image of the subject, then modifying the image in amount corresponding in degree to the amount of light which shall fall from said subject upon said plate, in carrying said modification to the point of causing said image to assume a predetermined illuminating value and setting the exposure controlling mechanism for the plate in accordance with the modification required to bring said image to the desired degree of illumination.

15. The method of securing uniformly-proper light action from a subject upon a sensitized plate, which consists in defining an independent image of the subject, then modifying the image in amount corresponding in degree to the length of time that the light falls from said subject upon said sensitized plate, carrying said modifying action to the point where the intensity of illumination of said image will correspond with that of a fixed standard and setting the exposure controlling mechanism in accordance with the modification required to bring said image to the desired degree of illumination.

16. The method of securing proper light action from a subject upon a sensitized plate, which consists in defining or forming an independent image of the subject, then modifying the image in amount corresponding in degree to the amount of light falling from said subject upon said sensitized plate, and then modifying said image in proportion to the speed of action of said plate, in bringing said modifying action to the point where the intensity of illumination of said independent image will correspond with that of a fixed standard and setting the exposure controlling mechanism in accordance with the modification required to bring said image to the desired degree of illumination.

17. The method of securing uniform light action from a subject upon a sensitized plate, which consists in forming an independent image of the subject, then modifying the image in amount corresponding in degree to the amount of light which shall fall from said subject upon the plate, and further modifying said image in degree corresponding to the length of time that the light shall fall from said subject upon the plate, then modifying said image in proportion to the sensitiveness of said plate, in carrying said modifying action to the point where the intensity of illumination of said image will correspond with that of a fixed standard and setting the exposure controlling mechanism for the plate in accordance with the modification required to bring said image to the desired degree of illumination.

18. The method of securing proper light action from a subject upon a sensitized plate, which consists in forming a luminous image of the subject, then modifying the luminosity of said image to correspond to a given standard and simultaneously adjusting the aperture or stop opening through which the light falls from said subject upon said sensitized plate.

19. The method of securing proper light action from a subject upon a sensitized plate, which consists in forming a luminous image of the subject, then modifying the luminosity of said image to correspond to a given standard, and simultaneously adjusting the amount of light and time of action of the light from the subject upon said sensitized plate.

20. The method of securing uniform light exposure from a subject upon a sensitized plate, which consists in forming a luminous image of the subject, then modifying the luminosity of said image to bring the same to a given standard, and simultaneously and conjointly therewith adjusting the time of exposure of the plate to the light from said subject.

21. The method of securing uniform light exposure of a sensitized plate to the light from a subject, which consists in forming a luminous image of the subject, then modifying the luminosity of said image to correspond to a given value, and simultaneously and conjointly therewith adjusting the quantity of light thrown on the plate from said subject.

22. The method of predetermining the proper exposure of a sensitive plate to light from a given subject, which method consists in defining an image of the subject, determining the photometric value of the image, and by the same act setting the stop opening of the plate exposure mechanism to the proper value.

23. The method of predetermining the proper exposure of a sensitive plate to light from a given subject, which method consists in defining an image of the subject, determining the photometric value of said image, and simultaneously setting the exposure timing mechanism to limit the time of exposure to the required value.

24. The method of predetermining the proper exposure of a sensitive plate to light from a given subject, which method consists in defining an image of the subject, determining the photometric value of the image, and by the same act setting the stop opening of the plate exposure mechanism and setting the exposure timing mechanism to the proper values respectively.

25. The method of securing proper light action from a subject upon a sensitized plate, which consists in defining an image of the subject, varying the time of exposure of the plate to the light from said subject and simultaneously modifying the image, said variation being carried to the extent of causing the resultant modification of the image to bring it to a predetermined condition or quality of illumination.

26. The method of securing proper light action from a subject upon a sensitized plate, which consists in defining an image of the subject, varying the amount of light admitted during exposure of the plate to the light from the subject and simultaneously modifying the image, said variation being carried to the extent of causing the resultant modification of the image to bring it to a predetermined condition or quality of illumination.

27. The method of securing proper light action from a subject upon a sensitized plate which consists in defining or forming an independent image of the subject, then varying the time of exposure of the plate to the light from the subject and simultaneously modifying the independent image, said variation being carried to the extent of causing the resultant joint modification of the image to bring it to a condition or quality of illumination commensurate with a given standard.

28. In combination, image defining mechanism, a standard of comparison for the image, means for modifying relatively to each other the light from the image and from said standard, exposure mechanism for a sensitive plate, said mechanism comprising an exposure timing device, and means controlled by said modifying means for governing said timing device.

29. In combination, image defining mechanism, a standard of comparison for the image, means for modifying relatively to each other the light from the image and the light from said standard, exposure mechanism for governing the exposure of a sensitive plate to the light from the subject, said mechanism comprising illumination controlling mechanism, and means controlled by said modifying means for governing said illumination controlling mechanism.

30. In combination, image defining mechanism, a standard of comparison for the image, means for modifying said image, exposure mechanism for governing the exposure of a sensitive plate to the light from a subject, said mechanism comprising an illumination controlling device and means controlled by said modifying means for governing said timing device.

31. In combination, image defining mechanism, a standard of comparison for the image, means for modifying said image, exposure controlling mechanism for controlling the exposure of a sensitive plate to the light from a subject, said mechanism comprising an exposure timing device, and means controlled by said modifying means for governing said timing device.

In witness whereof, I hereunto subscribe my name this 25th day of Aug. A. D. 1915.

ALFRED HERZ.